US006577227B1

(12) United States Patent
Kirchlinde et al.

(10) Patent No.: US 6,577,227 B1
(45) Date of Patent: Jun. 10, 2003

(54) REMOTE-CONTROLLED ACCESS CONTROL DEVICE, IN PARTICULAR FOR A MOTOR VEHICLE, AND PORTABLE TRANSPONDER WHICH IS CONFIGURED FOR IT

(75) Inventors: Thomas Kirchlinde, Regensburg (DE); Thomas Röhrl, Barbing (DE); Wolfgang Piesch, Regenstauf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/455,600

(22) Filed: Dec. 6, 1999

(30) Foreign Application Priority Data

Dec. 4, 1998 (EP) .......................................... 98123009

(51) Int. Cl.[7] ............................................. G05B 19/00

(52) U.S. Cl. .................... 340/5.62; 340/5.61; 340/5.64; 340/5.72; 340/426

(58) Field of Search ................................ 340/5.6–5.62, 340/5.63, 5.64, 5.65, 5.72, 425, 426; 307/10.2, 10.5

(56) References Cited

U.S. PATENT DOCUMENTS 5,682,135 A * 10/1997 Labonde ..................... 340/426
6,323,566 B1 * 11/2001 Meier ........................ 307/10.2

FOREIGN PATENT DOCUMENTS

| | | | |
|---|---|---|---|
| DE | 40 20 445 | A1 | 1/1992 |
| DE | 43 29 679 | C2 | 3/1995 |
| EP | 0 735 218 | A2 | 10/1996 |
| EP | 0 848 123 | A2 | 6/1998 |
| GB | 2 253 291 | A | 9/1992 |

* cited by examiner

*Primary Examiner*—Julie Lieu
(74) *Attorney, Agent, or Firm*—Laurence A. Greenberg; Werner H. Stemer; Ralph E. Locher

(57) ABSTRACT

A remote-controlled access control device includes a stationary transceiver device with a triggering device and a portable transponder. The stationary transceiver device transmits an interrogation code signal in response to the triggering device being activated. The portable transponder receives the interrogation code signal and has a manually activatable activation element. The portable transponder generates a code signal and transmits, together with the code signal, information indicating whether the code signal is generated in response to the interrogation code signal or in response to the activation element being activated. The stationary transceiver device receives the information together with the code signal and generates an unlocking signal based on an evaluation of the code signal with the information indicating whether the code signal is generated in response to the interrogation code signal or in response to the activation element being activated.

20 Claims, 2 Drawing Sheets

REMOTE-CONTROLLED ACCESS CONTROL DEVICE, IN PARTICULAR FOR A MOTOR VEHICLE, AND PORTABLE TRANSPONDER WHICH IS CONFIGURED FOR IT

BACKGROUND OF THE INVENTION

FIELD OF THE INVENTION

The invention relates to a remote-controlled access control device, in particular for a motor vehicle, and a transponder which is configured for it.

German Patent DE 43 29 697 C2 discloses a remote-controlled access control device. A stationary transceiver unit, disposed for example in a motor vehicle, transmits an interrogation code signal when a triggering device (for example a door handle) is activated. The signal is received by a transponder which is carried by the user and is answered with a response code signal. The transceiver unit compares the received response code signal with a stored reference code signal and, when they correspond, enables access, i.e. unlocks the motor vehicle door. The transponder may be configured in the form of a conventional key or as a chip card.

In such a system, there may, however, possibly be a problem in that the transponder is addressed without authorization by a nonauthorized transmitter which simulates the interrogation code signal and the transponder subsequently transmits the response code signal. Due to the relatively large range of such radio signals, this response code signal can possibly be received by the stationary transceiver device even if the legitimate carrier or user of the transponder is already at a greater distance from the object, for example the motor vehicle, which is to be controlled. In this case, access to the object is enabled without the legitimate user having caused the access or without the user receiving information on this unauthorized opening procedure. There is also a risk of an unauthorized access to an object if the response code signal of the transponder is recorded and copied without authorization, and this copied response code signal is then used to obtain access.

SUMMARY OF THE INVENTION

It is accordingly an object of the invention to provide a remote-controlled access control device which overcomes the above-mentioned disadvantages of the heretofore-known devices of this general type and which reduces the risk of an unauthorized unlocking procedure.

With the foregoing and other objects in view there is provided, in accordance with the invention, a remote-controlled access control device, in particular for a motor vehicle, including a triggering device; a stationary transceiver device connected to the triggering device, the stationary transceiver device transmitting an interrogation code signal in response to the triggering device being activated; a portable transponder configured to receive the interrogation code signal and having a manually activatable activation element, the portable transponder generating a code signal and transmitting, together with the code signal, a given information indicating whether the code signal is generated in response to the interrogation code signal or in response to the activation element being activated; and the stationary transceiver device receiving the given information together with the code signal and generating an unlocking signal based on an evaluation of the given information and based on a comparison of the code signal with an internal reference code signal.

In accordance with another feature of the invention, the portable transponder is configured such that the given information is formed as a part of the code signal.

In accordance with a further feature of the invention, the stationary transceiver device, after receiving the code signal and evaluating the code signal as a correct code signal, emits at least a further interrogation code signal, which may be different from the interrogation code signal, and wherein the portable transponder, in response to the at least one further interrogation code signal, transmits at least a further code signal, which may be different from the code signal, the stationary transceiver device receives and evaluates the at least one further code signal transmitted by the portable transponder.

In accordance with an added feature of the invention, the stationary transceiver device provides the at least one further interrogation code signal as a signal that is different from the interrogation code signal.

With the objects of the invention in view there is also provided, a remote-controlled access control device, including a triggering device; a stationary transceiver device connected to the triggering device, the stationary transceiver device transmitting an interrogation code signal in response to the triggering device being activated; a portable transponder configured to receive the interrogation code signal and having a manually activatable activation element, the portable transponder selectively transmitting a first code signal in response to the interrogation code signal and a second code signal in response to the activation element being activated; and the stationary transceiver device receiving one of the first and second code signals and generating an unlocking signal based on an evaluation of the one of the first and second code signals.

In accordance with another feature of the invention, the stationary transceiver device stores or generates a first reference code signal for a comparison with the first code signal and a second reference code signal for a comparison with the second code signal, the stationary transceiver device generates the unlocking signal based on a comparison of one of the first and second code signals with the respective first and second reference code signals.

With the objects of the invention in view there is further provided, a portable transponder, in particular a motor vehicle key, which is configured for an access control device and which includes a manually activatable activation element; a control device connected to the manually activatable activation element, the control device generating a code signal and, together with the code signal, a given information indicating whether the code signal is generated in response to an interrogation code signal received from a stationary transceiver device or in response to the activation element being activated; and a portable transceiver connected to the control device, the portable transceiver being configured to receive the interrogation code signal from the stationary transceiver device and transmitting the code signal together with the given information.

With the objects of the invention in view there is additionally provided, a portable transponder including a manually activatable activation element; a control device connected to the manually activatable activation element, the control device selectively generating a first code signal in response to an interrogation code signal received from a stationary transceiver device and a second code signal in response to the activation element being activated; and a portable transceiver connected to the control device, the portable transceiver being configured to receive the interrogation code signal from the stationary transceiver device and transmitting one of the first and second code signals.

Depending on whether the transponder has received an interrogation code signal or whether the transponder is made to emit signals as a result of a manual activation of its activation element (actuation element), the transponder transmits different transmission signals to the stationary transceiver unit. These different transmission signals can be based on the distinction that, when an interrogation code signal is received and when the activation element is activated or actuated, the transponder always outputs the same base code signal, however, with an additional, added item of information, for example an identification or identifier, which indicates whether the transponder has been made to emit the code signal as a result of the reception of an interrogation code signal or as a result of the activation or manipulation of the activation element.

This additional information may not only be formed of an identification which has been added but may also be communicated in some other way, for example through the use of a different number of transmissions of the same code signal depending on whether an interrogation code signal had previously been received or else whether the activation element had been pressed. Such a configuration avoids the necessity of having to lengthen the code signal as such (by adding the identification) and having to generate this information on an updated basis at each transmission procedure. Instead, one and the same code signal can always be used, the cause of the transmission of the code signal being communicated by the transmission repetition number, in other words by how often the same code signal has been transmitted. For example, the configuration may be such that when the interrogation code signal is received, the code signal is transmitted twice in succession, while when the activation element is activated or actuated, the code signal is transmitted only once, or alternatively, three times.

In an alternative embodiment, provision may be made for carrying out an opening procedure only when there has been a multiple, for example triple, repetition of the interrogation and response code cycle. In this case, the interrogation code signal must be made available repeatedly at the correct time, which increases the level of security against an unauthorized opening procedure. If appropriate, the interrogation and/or response code signal can be changed during the repetition of the interrogation and response code cycles, for example by a respective recalculation of the interrogation and/or response code signal which is to be newly transmitted, the recalculation being based on the previously transmitted interrogation and/or response code signal and on an internal is key which is known to the transponder and to the stationary transceiver unit.

Furthermore, when the transponder activation element is actively activated or manipulated, in each case a plurality of code signals may be emitted by the transponder, preferably with an alternating coding. This increases the level of security against obtaining unauthorized access by copying the transponder code signals, since the signals then have to be respectively transmitted in the correct chronological order or time sequence and with the correct time interval or intervals. In this case, and in the case explained in the preceding paragraph, the stationary transceiver unit also checks the chronological position and chronological order or sequence of the code signals transmitted by the transponder, that is to say additionally checks a time criterion.

Alternatively it is also possible to configure the transponder in such a way that it can store (or generate) two different code signals, one of which is emitted in reaction to the reception of an interrogation code signal and the other in reaction to the activation or actuation of the activation element. The stationary transceiver unit checks the received code signal and, if appropriate, the additionally determined information, in which case, if it has previously transmitted an interrogation code signal it then expects, and makes available, a different item of information and/or a different reference code signal than in the event of an interrogation code signal not having been emitted beforehand. Only if the received code signal, and possibly the additional information, corresponds to the reference code signal which is currently made available and/or the currently expected information, does the transceiver device bring about the unlocking of the access, but otherwise it leaves the access blocked or disabled. If, in the case described at the beginning, the transponder has the interrogation signal applied or sent to it through the use of an unauthorized transmitter, it consequently transmits a code signal and/or an item of information which signals the preceding reception of an interrogation code signal to the stationary transceiver unit. Since the transceiver unit has, however, not emitted any such interrogation code signal and thus accepts only the code signal (or the associated additional information) associated with the activation of the transponder activation element, access remains blocked or disabled.

Access is enabled only if the transceiver device has itself actually previously transmitted the interrogation code signal. Likewise access is enabled if the code signal is transmitted on the basis of an activation of the activation element which is disposed at the transponder.

The transceiver device is configured in such a way that after an interrogation code signal is emitted a time window is opened for a brief time period of, for example, one second and only a response code signal which is received within this time window is accepted. The time window can be implemented by an internal timer, set to the corresponding time interval and being started when the interrogation code signal is emitted, the time window being closed again when the timer expires.

The invention can be used not only in motor vehicles but also generally in door locking systems, for example of houses and/or apartments or rooms.

The scope of the invention also includes a method for remote-controlled access in which signals are generated, transferred and evaluated in the manner described above.

Other features which are considered as characteristic for the invention are set forth in the appended claims.

Although the invention is illustrated and described herein as embodied in a remote-controlled access control device, in particular for a motor vehicle, and a portable transponder which is configured for it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
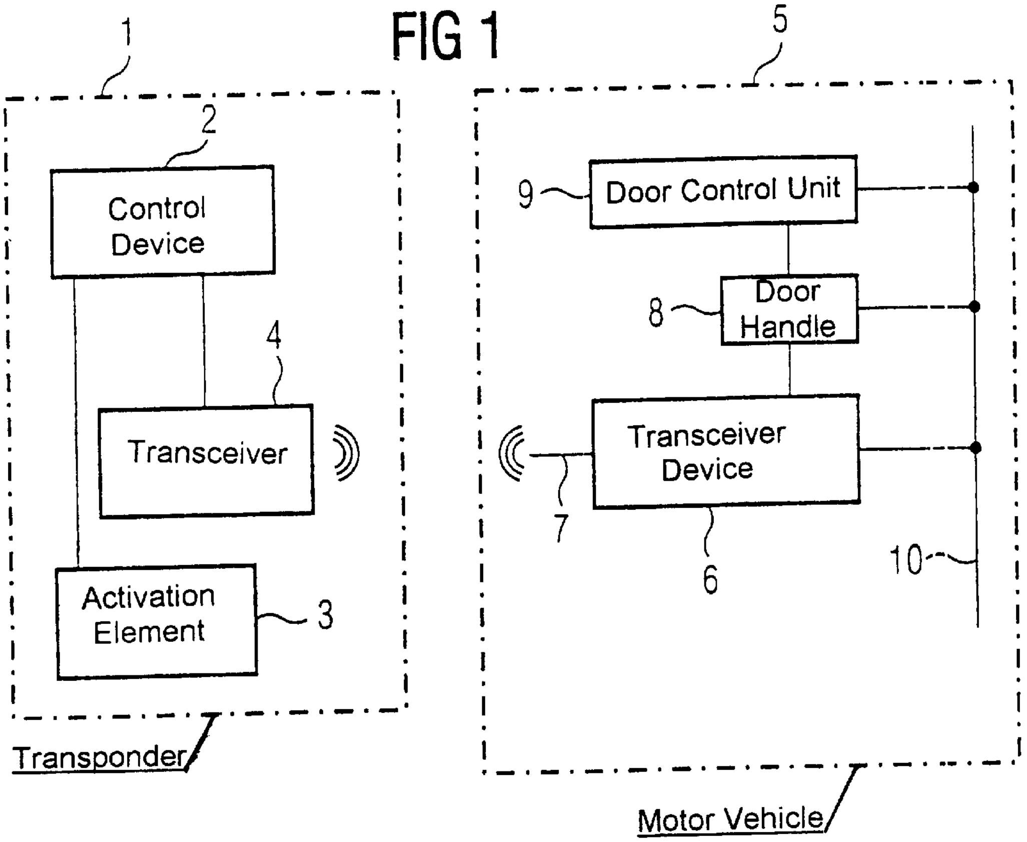
FIG. 1 is a block diagram of an exemplary embodiment of the remote-controlled access control device according to the invention.

Referring now to the figures of the drawings in detail and first, particularly, to FIG. 1 thereof, there is shown a key in the form of a portable transponder which contains a control device 2, for example a microchip, an activation element 3 which can be activated manually by the owner of the transponder, and a transceiver 4. The transponder 1 can be in the customary form of a key, can be embodied as a chip card or can be configured in some other expedient way. The activation element 3 is connected to the control device 2 so that the latter can monitor and interrogate the activation state (actuation state) of the activation element 3 at any time. Furthermore, the control device 2 is connected to the transceiver 4 and not only detects signals received from the latter but also causes it to emit code signals.

FIG. 1 also illustrates in schematic form a number of components of a motor vehicle 5 in which the access control device according to the invention is used. The motor vehicle 5 contains a transceiver device 6 which can transmit and receive code signals through the use of an antenna 7 mounted, for example, on the exterior mirror. The motor vehicle has an externally accessible activation device, for example in the form of a door handle 8 or corresponding control keys which are disposed on a door or some other motor vehicle component which can be activated by the user and which, when activated, causes the transceiver device to transmit an interrogation code signal to the transponder 1. In addition, there is a control unit, for example a door control unit 9, which controls the unlocking and locking of the motor vehicle doors and is connected to the transceiver device 6 via a data communications line, for example a bus 10. The transceiver device 6 and the door control unit 9 may, if expedient, also be functionally combined as one unit.

Figure 2:
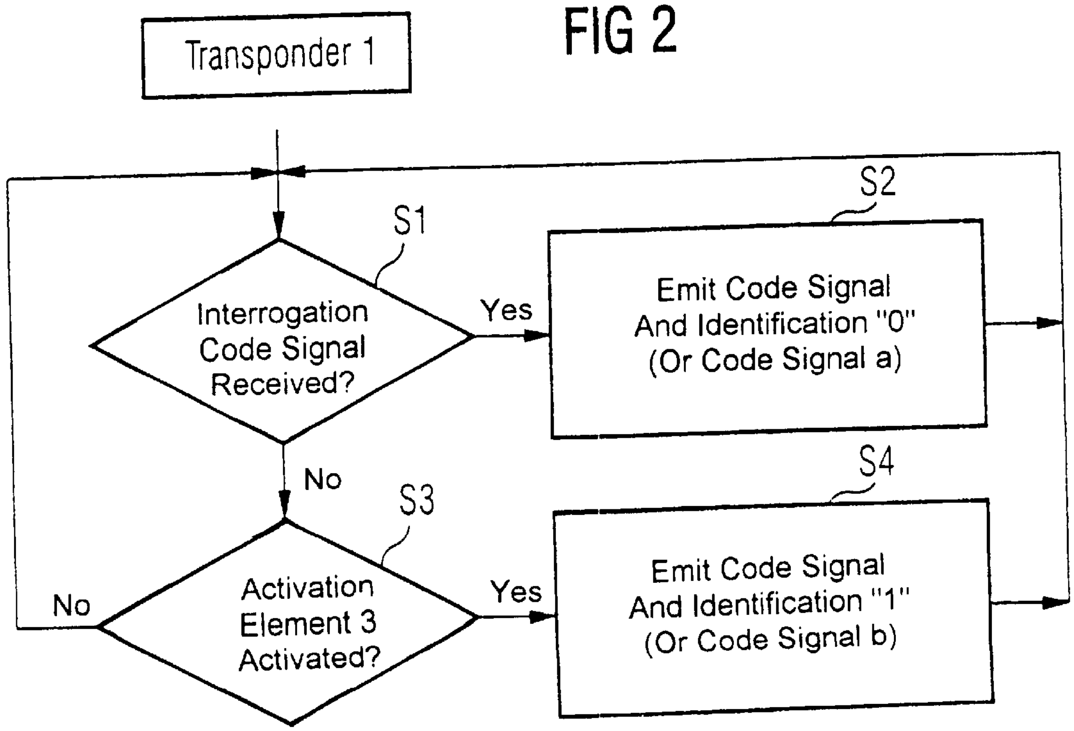
FIG. 2 is a flowchart illustrating the operation of the transponder.
Figure 3:
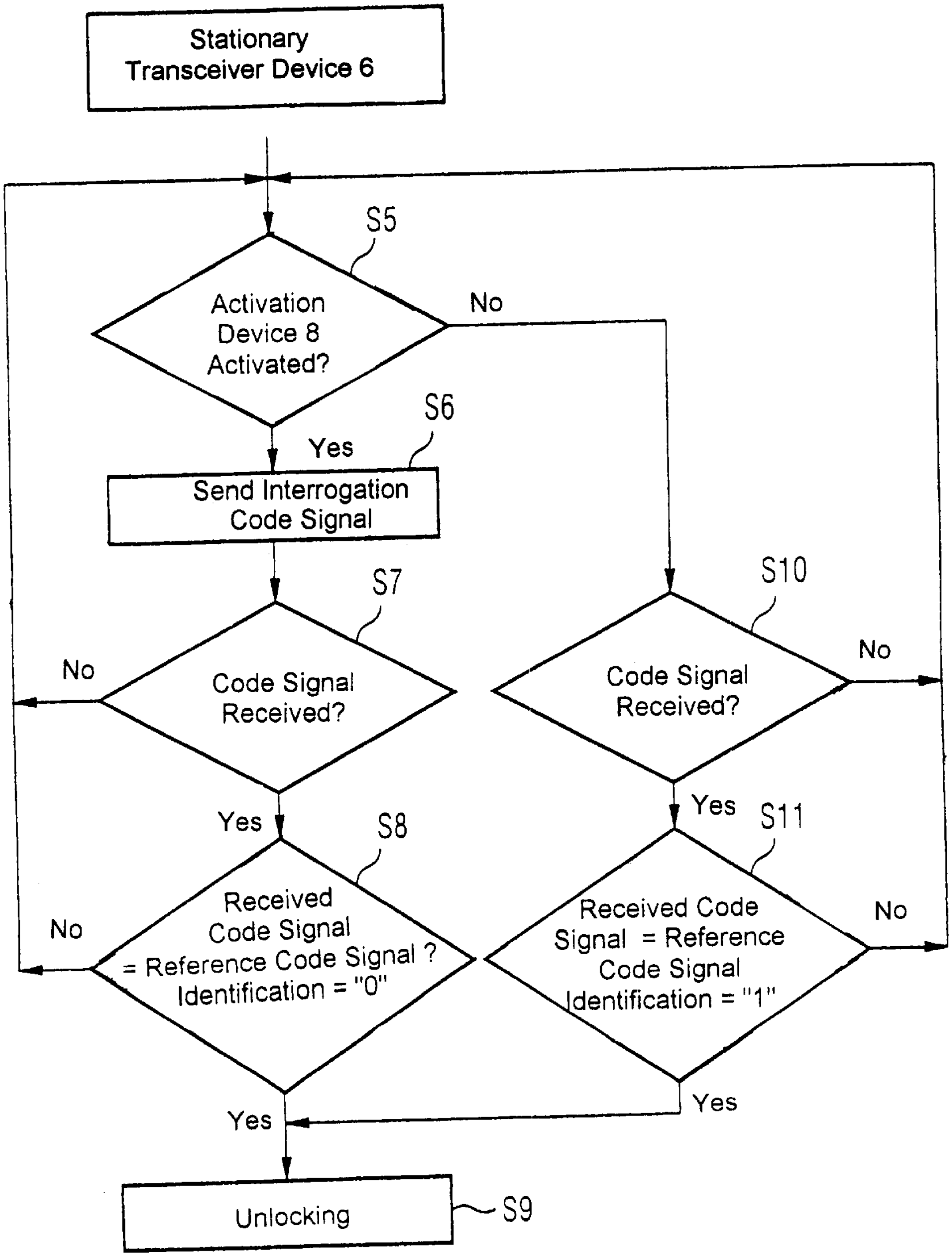
FIG. 3 is a flowchart illustrating the operation of the stationary transceiver device.

FIGS. 2 and 3 illustrate in more detail the operation of the transponder 1 and of the transceiver device 6. According to FIG. 2, in a step S1 the transponder 1 checks continuously or at regular or irregular intervals whether an interrogation code signal is received from the transceiver device 6 via the transceiver 4. If this is the case, this is sensed by the control device 2, which subsequently causes the transceiver 4 to emit a defined code signal (step 2) which is stored in the control device or generated by the control device. In addition, a certain item of information, for example the identification “0”, is transmitted. Alternatively, in step S2, the control device 2 can cause the transceiver 4 to emit a specific code signal, for example the code signal a, which is provided for the case of a preceding reception of an interrogation code signal.

If no reception of an interrogation code signal is determined in step S1, the process proceeds to a step S3 during which it is checked whether the activation element 3 is activated, which is sensed by the control device 2. If this is the case, the control device 2 causes the transceiver 4 to emit the code signal, but now with a different item of information, for example the identification “1” (step S4). Alternatively, the control device 2 can also cause the transceiver 4 to emit a different code signal b which differs from the code signal a. If it is determined in step S3 that the activation element 3 is not activated, the process returns to the start of the sequence shown in FIG. 2. This is also the case after steps S2 and S4. Steps S1 and S3 are thus run through cyclically.

FIG. 3 shows the operational process in the stationary transceiver device 6. In a step S5 it is checked whether the activation device or actuation device, which is provided at the motor vehicle and which can be activated by the user of the motor vehicle, is activated. The activation or actuation device is for example a door handle 8. If this is the case, in step S6 the transceiver device 6 causes a defined interrogation code signal to be transmitted to the transponder 1, and, in a step S7, it then waits for a specific time interval for the reception of a code signal which is transmitted back by the transponder 1 in response. If no response signal is received during the predefined time period, the operational process returns to the start of the sequence shown in FIG. 3. However, if a code signal is detected in step S7, the code signal is compared in a step S8 with a reference code signal which is stored or generated in the transceiver device 6. Furthermore, in step S8 it is checked whether the received code signal is provided with an additional item of information, namely the identification “0”. If the results of both checks are positive, the door control unit 9 is instructed to unlock the door or doors of the motor vehicle in a step S9. Otherwise, the operational process returns to the start of the sequence illustrated in FIG. 3, without the motor vehicle being unlocked.

The transceiver device can also be programmed in such a way that if it has received incorrect response code signals once or repeatedly, it interrupts communication for a specific time period of, for example, 3 to 10 minutes, that is to say during this time it no longer reacts to response code signals and does not generate any interrogation code signals either. Alternatively or additionally, the transceiver device can also be configured in such a way that after incorrect response code signals have been received once or repeatedly, an opening procedure can be carried out only with a special key (or code) from an authorized office.

If the alternative, shown in FIG. 2, of emitting the code signal a in step S2 is implemented, the code signal a is made available as reference code signal in step S8, and if it corresponds to the received code signal the system proceeds to step S9 (unlocking). In this case, there is no checking of the identification to be carried out in step S8.

If the result in step S5 is that the triggering device 8 has not been activated, the system goes to a step S10 in which it is checked whether a code signal is being received by the antenna 7. If this is not the case, the process returns to the start of the sequence shown in FIG. 3 so that the interrogations according to steps S5 and S10 are run through repeatedly until one of these interrogations leads to the result “yes”. If this is the case in step S10, the received code signal is compared with the reference code signal in step S11, and it is checked further whether the information transmitted with the received code signal corresponds to the identification “1”. If this is the case, the system goes to step S9 and the door or doors of the motor vehicle are unlocked. Alternatively, in step S11, the code signal b can be formed as reference code signal and it can be checked whether the received code signal corresponds to this reference code signal. In this case, no checking of the identification is necessary. As a further alternative, the information which is additionally transmitted with the code signal by the transponder may also be formed of or provided by the number of repetitions of the code signals, their frequency, the amplitude course or by some other parameter. This parameter is then checked in steps S8 and S11.

We claim:

1. A remote-controlled access control device, comprising:

a triggering device;

a stationary transceiver device connected to said triggering device, said stationary transceiver device transmitting an interrogation code signal when said triggering device is activated;

a portable transponder configured to receive the interrogation code signal and having a manually activatable activation element, said portable transponder generating a code signal and transmitting, together with the code signal, a given information indicating whether the code signal is generated in response to the interrogation code signal or in response to said activation element being activated; and said stationary transceiver device receiving the given information together with the code signal and generating an unlocking signal based on an evaluation of the given information and based on a comparison of the code signal with an internal reference code signal.

2. The remote-controlled access control device according to claim 1, wherein said portable transponder is configured such that the given information is formed as a part of the code signal.

3. The remote-controlled access control device according to claim 1, wherein said portable transponder is configured such that the given information is an identification added to the code signal.

4. The remote-controlled access control device according to claim 1, wherein said portable transponder is configured such that the given information is transmitted by transmitting the code signal repeatedly with a given repetition number, the given information being the given repetition number.

5. The remote-controlled access control device according to claim 1, wherein said stationary transceiver device includes a timer defining a given time interval after transmitting the interrogation code signal, said stationary transceiver device evaluates the code signal only if the code signal is received within the given time interval.

6. The remote-controlled access control device according to claim 1, wherein said stationary transceiver device, after receiving the code signal and evaluating the code signal as a correct code signal, emits at least a further interrogation code signal, and wherein said portable transponder, in response to the at least one further interrogation code signal, transmits at least a further code signal, said stationary transceiver device receives and evaluates the at least one further code signal transmitted by said portable transponder.

7. The remote-controlled access control device according to claim 6, wherein said stationary transceiver device provides the at least one further interrogation code signal as a signal different from the interrogation code signal.

8. The remote-controlled access control device according to claim 6, wherein said portable transponder provides the at least one further code signal as a signal different from the code signal.

9. The remote-controlled access control device according to claim 1, including an unlocking unit connected to said triggering device, said unlocking unit to be installed in a motor vehicle and receiving the unlocking signal.

10. A remote-controlled access control device, comprising:

a triggering device;

a stationary transceiver device connected to said triggering device, said stationary transceiver device transmitting an interrogation code signal when said triggering device is activated;

a portable transponder configured to receive the interrogation code signal and having a manually activatable activation element, said portable transponder selectively transmitting a first code signal in response to the interrogation code signal and a second code signal in response to said activation element being activated; and said stationary transceiver device receiving one of the first and second code signals and generating an unlocking signal based on an evaluation of the one of the first and second code signals.

11. The remote-controlled access control device according to claim 10, wherein said stationary transceiver device stores a first reference code signal for a comparison with the first code signal and a second reference code signal for a comparison with the second code signal, said stationary transceiver device generates the unlocking signal based on a comparison of one of the first and second code signals with the respective first and second reference code signals.

12. The remote-controlled access control device according to claim 10, wherein said stationary transceiver device generates a first reference code signal for a comparison with the first code signal and a second reference code signal for a comparison with the second code signal, said stationary transceiver device generates the unlocking signal based on a comparison of one of the first and second code signals with the respective first and second reference code signals.

13. The remote-controlled access control device according to claim 10, wherein said stationary transceiver device includes a timer defining a given time interval after transmitting the interrogation code signal, said stationary transceiver device evaluates the one of the first and second code signals only if one of the first and second code signals is received within the given time interval.

14. The remote-controlled access control device according to claim 10, wherein said stationary transceiver device, after receiving one of the first and second code signals and evaluating the one of the first and second code signals as a correct code signal, emits at least a further interrogation code signal, and wherein said portable transponder, in response to the at least one further interrogation code signal, transmits at least a further code signal, said stationary transceiver device receives and evaluates the at least one further code signal transmitted by said portable transponder.

15. The remote-controlled access control device according to claim 14, wherein said stationary transceiver device provides the at least one further interrogation code signal as a signal different from the interrogation code signal.

16. The remote-controlled access control device according to claim 14, wherein said portable transponder provides the at least one further code signal as a signal different from the one of the first and second code signals.

17. A transponder, comprising:

a manually activatable activation element;

a control device connected to said manually activatable activation element, said control device generating a code signal and, together with the code signal, a given information indicating whether the code signal is generated in response to an interrogation code signal received from a stationary transceiver device or in response to said activation element being activated; and a portable transceiver connected to said control device, said portable transceiver being configured to receive the interrogation code signal from the stationary transceiver device and transmitting the code signal together with the given information.

18. A transponder according to claim 17, wherein said manually activatable activation element, said control device, and said portable transceiver are configured to be installed in a motor vehicle key.

19. A transponder, comprising:

a manually activatable activation element;

a control device connected to said manually activatable activation element, said control device selectively generating a first code signal in response to an interrogation code signal received from a stationary transceiver device and a second code signal in response to said activation element being activated; and a portable transceiver connected to said control device, said portable transceiver being configured to receive the interrogation code signal from the stationary transceiver device and transmitting one of the first and second code signals.

20. A transponder according to claim 19, wherein said manually activatable activation element, said control device, and said portable transceiver are configured to be installed in a motor vehicle key.

* * * * *